May 30, 1933. W. O. WAGNER 1,911,295
COMBINED ACCELERATOR PEDAL AND SWITCH FOR MOTOR VEHICLES
Filed Oct. 21, 1931 2 Sheets-Sheet 2
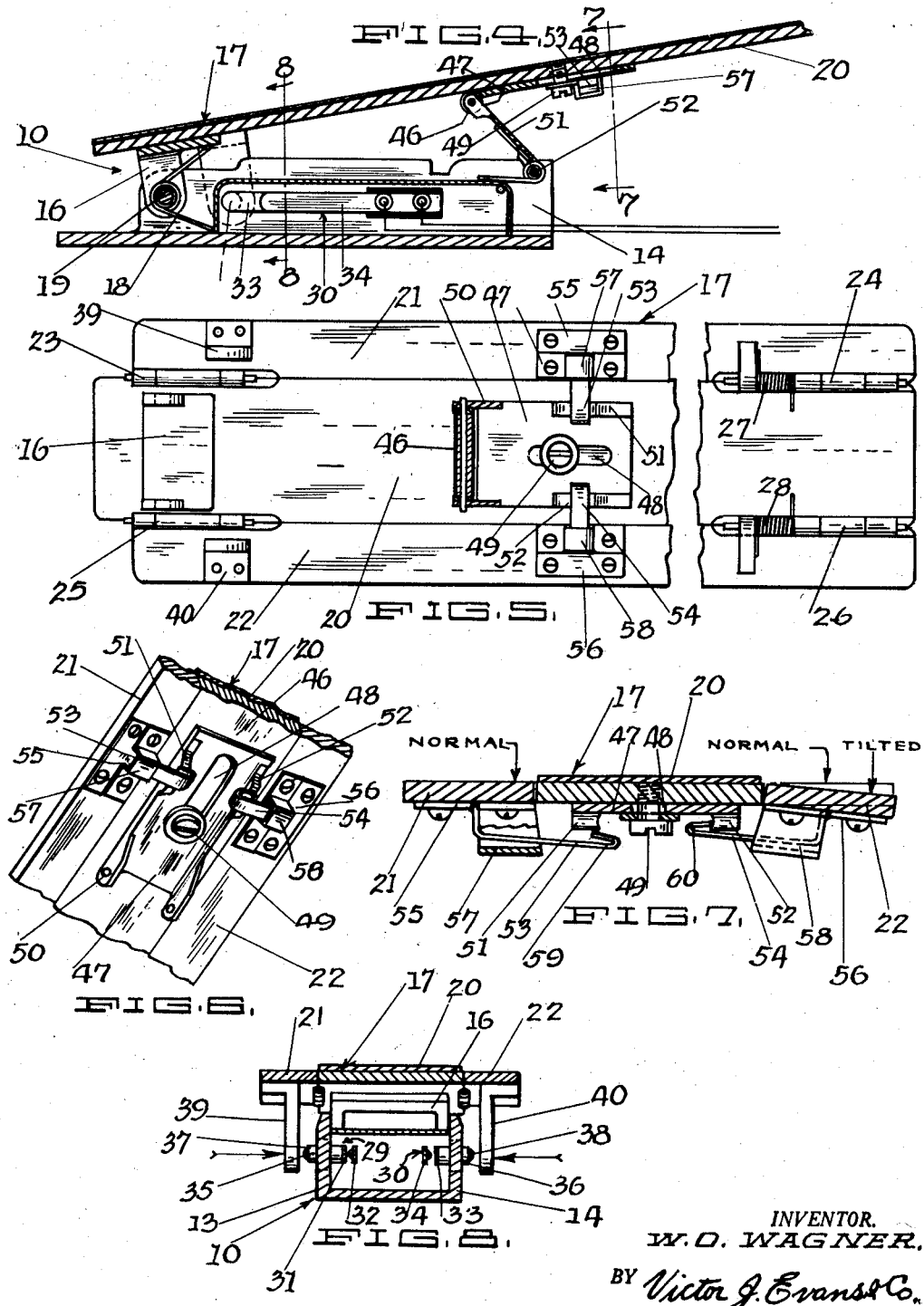
INVENTOR.
W. O. WAGNER.
BY Victor J. Evans & Co.
ATTORNEYS.

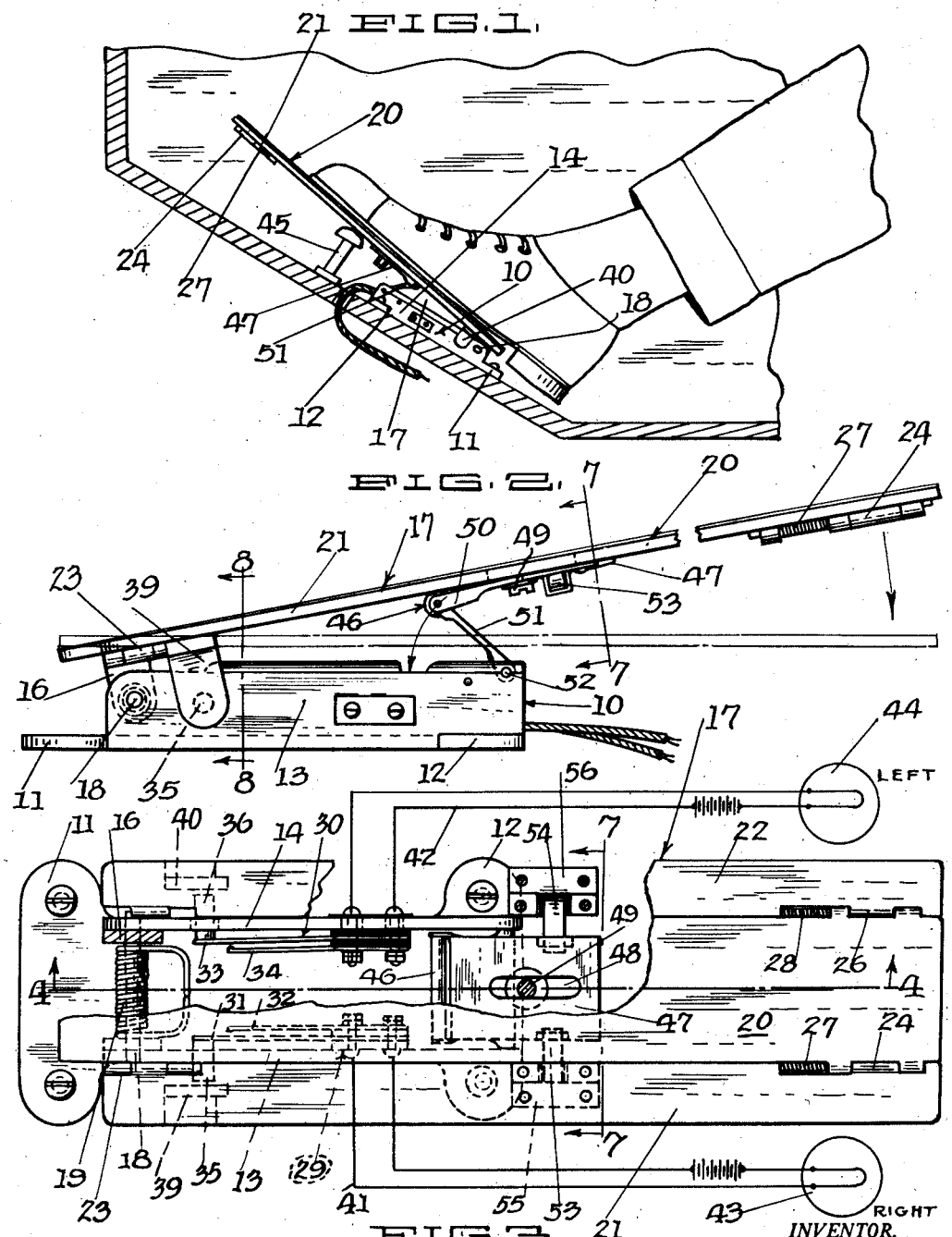
May 30, 1933.                W. O. WAGNER                1,911,295
COMBINED ACCELERATOR PEDAL AND SWITCH FOR MOTOR VEHICLES
Filed Oct. 21, 1931        2 Sheets-Sheet 1
INVENTOR.
W. O. WAGNER.
BY Victor J. Evans & Co
ATTORNEYS.

Patented May 30, 1933

1,911,295

UNITED STATES PATENT OFFICE

WILLIAM O. WAGNER, OF INGLEWOOD, CALIFORNIA

COMBINED ACCELERATOR PEDAL AND SWITCH FOR MOTOR VEHICLES

Application filed October 21, 1931. Serial No. 570,192.

This invention relates generally to improvements in switch mechanisms for controlling the directional signals of motor vehicles, and also combines means for actuating the accelerator pedal of a vehicle to control the speed thereof.

The principal object of this invention is to provide an improved switch mechanism combined with the accelerator pedal to cause the making and breaking of the directional signals of the vehicle without removing the foot from the accelerator pedal.

A further object of this invention is the provision of a novel switch mechanism of the class indicated, which includes means for locking the switch mechanism in closed position.

A still further object is the provision of a combined accelerator pedal and switch actuating means for directional indicators, which is positive in its action, simple in construction and may be easily applied to any motor vehicle.

Other objects and advantages will be apparent during the course of the following description.

In the accompanying drawings forming a part of this specification and in which like numerals are employed to designate like parts throughout the same, Fig. 1 is a sectional detail of a section of a motor vehicle dash board showing my improved accelerator pedal and switch mounted thereon in position for use, Fig. 2 is an enlarged side elevation of the combined accelerator pedal and switch mechanism showing the pedal depressed as shown in dot and dash lines, Fig. 3 is a top plan view of an accelerator pedal and switch mechanism with a portion thereof broken away to disclose interior parts, Fig. 4 is a longitudinal sectional view of the switch mechanism as indicated by the section line 4—4 of Fig. 3, Fig. 5 is an inverted plan view of the accelerator pedal and hinged switch actuating element, the housing being omitted for clearness of illustration, Fig. 6 is a perspective view illustrating the latching mechanism for latching the switch operating elements in closed position, Fig. 7 is an enlarged transverse sectional detail of the accelerator pedal switch actuating elements and the latching means therefor, one switch element being shown in latched and operative position, the section being indicated by the line 7—7 of Figs. 2, 3 and 4, and Fig. 8 is an enlarged transverse section showing the means for actuating the switches which alternately close the electric circuit, the section being indicated by the lines 8—8 of Figs. 2 and 4.

In the accompanying drawings wherein for the purpose of illustration is shown a preferred embodiment of my invention, the numeral 10 designates a housing, having attached ears 11 and 12 and upwardly extending flanges 13 and 14. Pivotally secured to the rear ends of the flanges 13 and 14, by means of a yoke 16, is a pedal mechanism 17. This pedal mechanism 17 swings about the bolt 18 and is held normally in open position as indicated in Figs. 1, 2 and 4 by means of a torsion spring 19.

The pedal mechanism 17 comprises a centrally disposed accelerator operating element 20 and longitudinally disposed signal operating elements 21 and 22. The elements 21 and 22 are hinged to the member 20 by means of hinges 23, 24, 25, and 26 respectively, the hinge members 24 and 26 being spring controlled by means of torsion springs 27 and 28 said springs tending to always normally hold the elements 21 and 22 in the position shown at the left in Figs. 7 and 8.

Jack switches 29 and 30 are mounted on the inner sides of the flanges 13 and 14 and these switches comprise spring elements 31, 32, 33 and 34, the elements 31 and 33 having fixed at their ends outwardly extending hollow lugs 35 and 36, which project through openings formed in the flanges 13 and 14, said lugs having fixed therein insulating material 37 and 38 as clearly disclosed in Fig. 8.

The switch actuating elements 21 and 22 are provided at their rear ends with downwardly extending members 39 and 40, adapted to contact the lugs 35 and 36. The members 39 and 40 press the lugs 35 and 36 inwardly and a circuit is made through the jack switches 29 and 30, through the medium of the elements 31, 32, 33 and 34 coming into contact with each other, this movement causing the circuits 41 or 42 to be closed, thus energizing either the left hand indicator 44 or the right hand indicator 43, as disclosed in Fig. 3.

Referring now to Fig. 1, it will be noted that the member 20 of the mechanism is in contact with the usual accelerator pedal 45 of a motor vehicle, and said accelerator is normally depressed by said member in the usual way, but when it is desired to operate the directional indicator, the foot of the operator is moved or tilted to the right or left side, and the elements 21 or 22 are depressed without in any manner effecting the acceleration of the engine. Mechanism coactively associated with the pedal 20 and the housing 10 for the actuation of the locking mechanism, comprises a sliding plate 47 having an elongated slot 48 therein, held in slidable relation against the under side of the pedal 20 by means of a bolt 49, said plate is provided at its ends with ears 50 and is linked to the housing 10 by means of a spring control link connection 51 swingable about the pivot 52, carried by said housing. A roller 46 is used to connect the lock sliding plate 47 and the spring control link connection 51, which roller makes possible smooth operation of the lock plate and will prevent excessive wear. When the accelerator pedal 20 is depressed, as in actuating the accelerator 45, the plate 47 slides back and forth, and has no function in this operation.

The plate 47 is provided on its side edges with lugs 51' and 52, as clearly disclosed in Figs. 3, 6 and 7, these lugs being slightly concave on their inner faces, as indicated in Fig. 7. The elements 21 and 22 are provided respectively with spring fingers 53 and 54, held in position by means of fixed plates 55 and 56. Housing members 57 and 58 envelope these spring fingers to limit possible sideward movement, the inner ends of said fingers being provided with hooks 59 and 60, said hooks normally resting on or above the lugs 51' and 52, as disclosed at the left hand side of Fig. 7. On the right hand side of said Fig. 7 the hook 60 is shown in contact with the lug 52, which position is that when the element 22 has been tilted downwardly by the foot of the operator, this position closing the circuit 42 and energizing the right turn indicator 43, the above description also applying to the elements 21, 53, 59 and 51 when said element 21 is tilted downwardly to operate the left turn indicator 44.

Either of the elements 21 and 22, when tilted to the position shown and latched, as above described, will remain in this latched position until the accelerator pedal 20 is again actuated, which operation causes the plate 47 to be moved backward, thus causing the lugs 51' and 52 to be withdrawn from the spring fingers 53 and 54, the torsion springs 27 and 28 then immediately returning the elements 21 or 22 to their normal positions.

The accelerator pedal 20 may be operated at will, without in any way affecting the switch mechanism. However, when the foot of the operator is moved or tilted slightly to the right or left to the elements 21 or 22 and these elements are slightly depressed, a signal is given, and if the operator has to remove his foot from the accelerator pedal for any reason, the element last actuated will remain in latched position, as described; until the foot is again returned and the accelerator pedal depressed, which releases the latching mechanism of the device.

It is to be understood that the form of my invention herewith shown and described, is to be taken as a preferred example of the same, and that various changes relative to the material, size, shape and arrangement of parts may be resorted to without departing from the spirit of the invention, or the scope of the subjoined claim.

Having thus described my invention, I claim:—

In a device of the character described, a housing, a pedal secured to said housing, spring means interposed between said housing and said pedal, hinge members pivotally connected to the opposite sides of said pedal, spring means for normally maintaining said hinged members in the same plane with said pedal, a sliding plate secured to the underside of said pedal, a link interposed between said plate and said housing whereby when said plate is moved with relation to said housing said plate will be slid, lugs formed on said plate, a spring finger connected to each of said hinge members, each of said spring members having a hooked extremity capable of contacting the lugs on said plate when said hinged member is in the same plane with said pedal, and to have their hooked extremities engage the sides of said lugs when said hinged members are pivoted out of the plane of said pedal, each of said hinged members having a downwardly extending member capable of actuating when moved, a pair of switch contacts carried on said housing.

In testimony whereof I affix my signature.

WILLIAM O. WAGNER.